US011443352B2

(12) United States Patent
Beuchel et al.

(10) Patent No.: US 11,443,352 B2
(45) Date of Patent: Sep. 13, 2022

(54) SERVICE BUNDLES IN SERVICE ORDER MANAGEMENT

(71) Applicant: SAP SE, Walldorf (DE)

(72) Inventors: Stephanie Beuchel, Dielheim (DE); Michael Vollmer, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/859,876

(22) Filed: Apr. 27, 2020

(65) Prior Publication Data

US 2021/0334867 A1    Oct. 28, 2021

(51) Int. Cl.
| | | |
|---|---|---|
| *G06Q 30/00* | (2012.01) | |
| *G06Q 30/04* | (2012.01) | |
| *G06Q 10/08* | (2012.01) | |
| *G06Q 10/00* | (2012.01) | |
| *G06Q 10/10* | (2012.01) | |
| *G06F 16/23* | (2019.01) | |
| *G06Q 30/06* | (2012.01) | |
| *G06F 3/0482* | (2013.01) | |
| *H04L 67/10* | (2022.01) | |

(52) U.S. Cl.
CPC ......... *G06Q 30/04* (2013.01); *G06F 16/2379* (2019.01); *G06Q 10/0875* (2013.01); *G06Q 10/1091* (2013.01); *G06Q 10/20* (2013.01); *G06Q 30/016* (2013.01); *G06Q 30/0635* (2013.01); *G06F 3/0482* (2013.01); *H04L 67/10* (2013.01)

(58) Field of Classification Search
CPC .... G06Q 30/04; G06Q 10/20; G06Q 10/1091; G06Q 30/0635

USPC .......................................................... 705/29
See application file for complete search history.

(56) References Cited

U.S. PATENT DOCUMENTS

| | | | |
|---|---|---|---|
| 7,979,329 B2 | 7/2011 | Cao et al. | |
| 10,325,276 B2 | 6/2019 | Walz et al. | |
| 2008/0243654 A1 | 10/2008 | Wernze et al. | |
| 2011/0196766 A1* | 8/2011 | Licardi | G06Q 40/00 705/30 |
| 2013/0110675 A1* | 5/2013 | Bouw | G06Q 30/04 705/26.8 |
| 2014/0379539 A1 | 12/2014 | Doddavula et al. | |

* cited by examiner

*Primary Examiner* — Rokib Masud
(74) *Attorney, Agent, or Firm* — Klarquist Sparkman, LLP

(57) ABSTRACT

Systems and processes for managing service orders for service bundles are provided herein. An account assignment object may be created in a service order database corresponding to a main item and a plurality of subitems may be linked to the account assignment object, the main item representing the service bundle and the plurality of subitems offered collectively as the service bundle. The main item and subitems may be part of a hierarchy structure in which the main item is at a higher level than the subitems. A value of the main item may be set corresponding to a price of the service bundle. Follow-up processing may be automatically performed and a billing document may be generated for the service order using the account assignment object. Entries for each of the main item and the plurality of subitems for the order may be displayed in a hierarchical line item view.

20 Claims, 8 Drawing Sheets

FIG. 2

SERVICE BUNDLES IN SERVICE ORDER MANAGEMENT

BACKGROUND

Financial reporting and controlling are often instituted on an individual item-level, whereby an offered bundled service is represented by separate line items for labor, product(s), and/or other service-related costs. In order to generate a report or invoice for the bundled service, or to evaluate the bundled service, the separate line items are typically accessed and/or processed, increasing computational load and processing time with each item included in the bundled service. This item-level approach increases difficulty in evaluating aspects such as profitability of a service and increases complexity of service reporting. Accordingly, there remains a need for improved technologies to manage service orders.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In summary, the detailed description is directed to various innovative technologies for managing, processing, and generating display information relating to service orders for service bundles. In some examples, the disclosed technologies can be implemented as a method performed by a computer. Service order data for an order of a service bundle is received, the service order data including main item information for a main item representing the service bundle and subitem information for a plurality of subitems offered collectively as the service bundle. An account assignment object is created in a service order database corresponding to the main item, and the plurality of subitems are associated with the main item in accordance with a hierarchy structure. The main item is higher in the hierarchy structure than the plurality of subitems. A value of the main item is set, the value of the main item corresponding to a price of the service bundle. Follow-up processing may automatically be performed on the order using the account assignment object. A billing document for the order may be generated using the account assignment object, a payment requested by the billing document being equal to the value of the main item. Entries for each of the main item and the plurality of subitems for the order may be displayed or generated for display in a hierarchical line item view.

In some examples, the disclosed technologies can be implemented as computer-readable media storing instructions which, when executed by one or more hardware processors, cause the hardware processors to perform the following actions. An account assignment object is created in a service order-related financial accounting database corresponding to a main item representing a service order for a service bundle. A plurality of subitems is associated with the main item in accordance with a hierarchy structure, where the main item is higher in the hierarchy structure than the plurality of subitems. The account assignment object is updated with a value of the main item corresponding to a price of the service bundle and with costs associated with the plurality of subitems. A billing document is generated for the order using the account assignment object. A user interface is generated for display at a client computing device, the user interface including entries for each of the main item and the plurality of subitems for the service order in a hierarchical line item view, wherein the value of the main item is included in the billing document and shown in the hierarchical line item view in the entry for the main item and the costs associated with the plurality of subitems are shown in the hierarchical line item view in respective entries for the plurality of subitems.

In some examples, the disclosed technologies can be implemented in a system including one or more hardware processors with coupled memory, and computer-readable media storing instructions executable by the one or more hardware processors. The instructions include first, second, third, fourth, fifth, and sixth instructions. The first instructions, when executed, cause service order data for a service order of a service bundle to be received via a user interface of a client computing device, the service order data including main item information for a main item representing the service bundle and subitem information for a plurality of subitems offered collectively as the service bundle, the plurality of subitems including a service part subitem. The second instructions, when executed, cause a hierarchical line view of the service order to be generated for display at the user interface, the hierarchical line view including a first line item entry for the main item and a plurality of second line item entries each associated with a respective subitem of the plurality of subitems. The third instructions, when executed, cause an account assignment object associated with the main item to be created. The fourth instructions, when executed, cause a purchase requisition for the service part subitem to be automatically generated, the purchase requisition identifying the account assignment object of the main item. The fifth instructions, when executed, cause a service confirmation for the service order to be generated using the account assignment object of the main item. The sixth instructions, when executed, cause a billing document for the service order to be created using the account assignment object of the main item, the billing document including a request for payment equal to a value of the main item, the value of the main item being automatically set according to master data indicating a base price of the main item or set based on an overriding fixed price input received via the user interface.

The foregoing and other objects, features, and advantages of the invention will become more apparent from the following detailed description, which proceeds with reference to the accompanying figures.

BRIEF DESCRIPTION OF THE DRAWINGS

FIG. 2 is an example of a user interface for creating and/or viewing a service bundle.

DETAILED DESCRIPTION

Introduction and Overview

Figure 1:
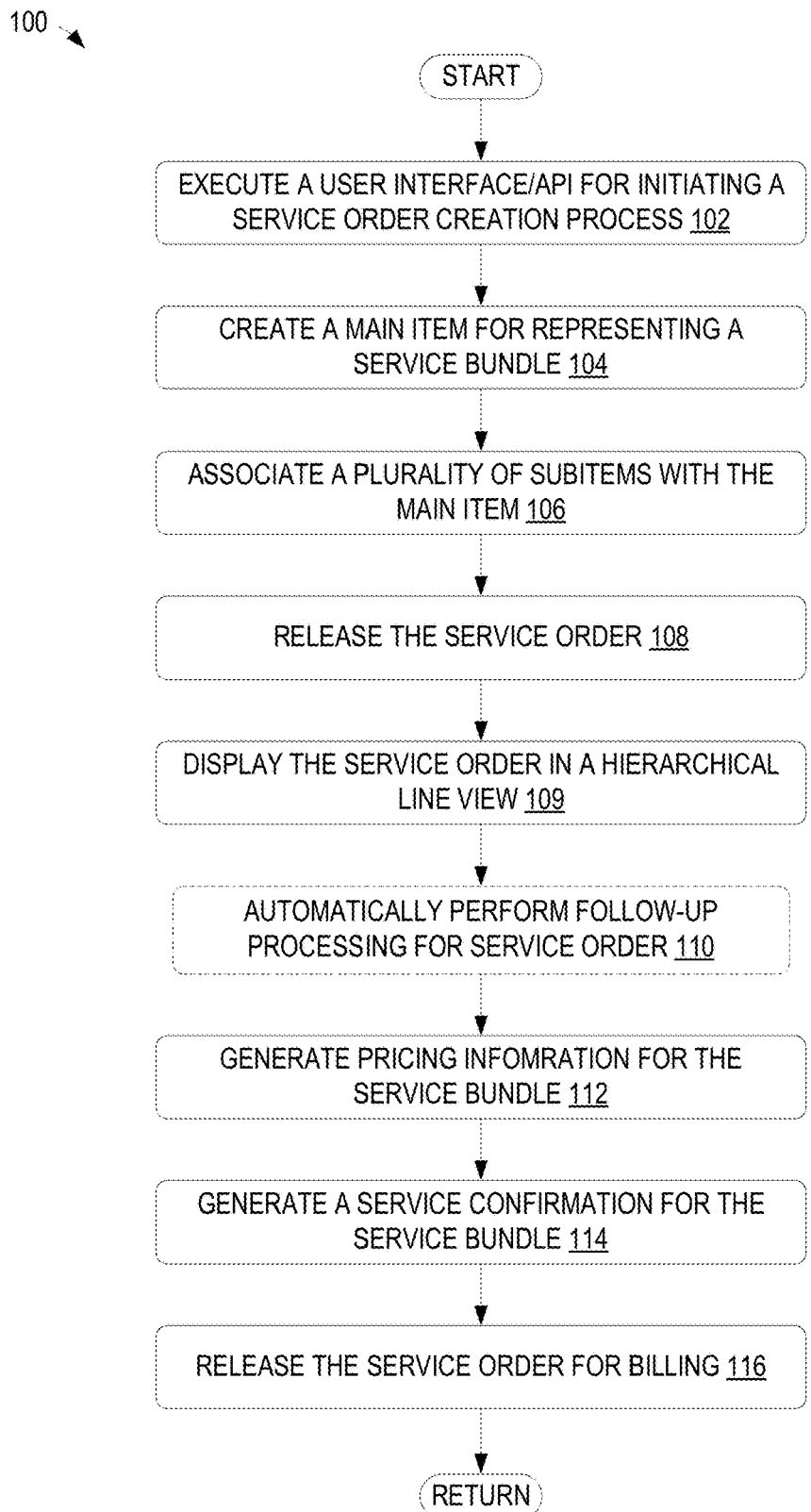
FIG. 1 is a flowchart of an example method for creating a service order for a service bundle.

Organizations often use software applications and/or databases to track offered products and services, including identifying/evaluating availability and pricing for the products and services, coordinating deployment of the products and services, invoicing the products and services for customers, etc. The products and services are typically represented in databases by respective individual line items. However, organizations may offer bundled services, which correspond to multiple services and/or products that are offered to a customer together. In a non-limiting example, a bundled service could include an oil change, which includes a labor item, corresponding to the labor of performing the oil change, and a product item, corresponding to the oil used in the oil change service. In other examples, even more complex bundled services may be offered, which include a larger number of items (e.g., service products, service parts, expense items, etc.). For ease of customer understanding and/or for marketing purposes, the combined items may be presented to a customer as a service bundle. Accordingly, representing the service bundle as individual line items in the organization's software applications/databases, while presenting the service bundle as a single, aggregated item to a customer, creates a disparity that increases complexity in evaluating and reporting the service bundle.

In order to focus market strategy, financial reporting, and service controlling/evaluation on an aggregated product/service level, the disclosure describes a service bundle data construct and related processing that provides a method to create an offering of service products, service parts, expense items, and/or other service-related items provided to a customer at a fixed price and/or at a sum total of prices of constituent items. The service bundle may be considered to be a product in its own right, and taxation, invoicing, revenue posting, and/or other operations may be performed on the service bundle level rather than at sub-item level.

The service order provides the possibility to plan services and additionally expenses and service parts. For example, each service order may include multiple items, each item having an associated type and/or associated parameters. Each type of item of the service order may create its own account assignment object, that is used for the further processing of these items. In some examples, the further processing of a service order includes creating a service confirmation (e.g., via a create service confirmation quick create view of a user interface) to post costs of the service order. The service, the expense, and the service part items may be processed in the service confirmation with reference to their corresponding service order item's account assignment object.

Two example options for billing the bundled service includes billing the service order, or billing the service confirmation. In one example of a fixed price scenario, the service order (which may include multiple service bundles in some examples) is priced with a fixed price and each service bundle main item may receive the part of the fixed priced accordingly. Each service bundle main item is billed with its price, and the billing document may list these items.

In another example scenario, a service bundle has a two-level hierarchy including a main item and one or more subitems. The main item may be a particular type of service item representing the service bundle, which operates as a commercial item and includes subitems for fulfilling an associated service. For example, the main item may not be a service that is performed by a person, but rather a representative item used for pricing and billing. Subitems of a main item may include service items (e.g., items relating to a service that is performed by a person), expense items, service part items (e.g., parts that are used for the service bundle and may be externally procured), and/or other types of items relating to the provision of a service bundle. In examples where the service bundle provides only a two-level hierarchy, the subitems do not have further subitems.

The service order main item is billed and the subitems of this main item are used for the execution of the service bundle and are not billed. A billing document may be generated for a customer for this main item with fixed price, without listing any subitems (e.g., using a "Release for Billing" application). For integration in the software/database an account assignment object may only be created for the main item, and all subitems of the main item are associated with this account assignment object. The further processing of these subitems may consider the account assignment object of the corresponding main item.

First Example Method

FIG. 1 is a flowchart 100 of an example method for creating/updating and processing a service order for a service bundle. For example, a service order may include a short-term agreement between a service provider and a service recipient, in which the service recipient orders one-off services (e.g., as a service bundle in this example) which are billed when completed using resource-related billing. The method includes, at 102, executing a user interface or application programming interface (API) for initiating a service order creation/updating process. The user interface and/or API may be executed on a client computing device, which may be communicatively connected to one or more additional computing devices via a network. For example, the user interface may include a web-based user interface (e.g., accessible via an Internet browser application executed on the client computing device) and/or the API may be used to call an application managed by an application server or other computing device(s) on the network (e.g., using Simple Object Access Protocol (SOAP) and/or one or more other messaging protocols).

At 104, the method includes creating a main item for representing the service bundle. As described above, the main item may be a particular kind of service item that is a representation for a collection of associated subitems for use in billing and other processing tasks relating to the service bundle. Creating the main item may include receiving input provided to the user interface/via the API to enter an identifier of the main item (e.g., an identifier of the service bundle) and to associate the identifier with a "main item" designation and generating a data object corresponding to the entered/selected information. For example, a user interface used for service order creation/updating may include a field for entering an item name and an associated drop-down menu for selecting a type of item, from which a "main item" designation may be selected. As a non-limiting example, designations for service product item categories may include a service product item (one-level, stand-alone) SVP2 (e.g., neither a main item nor a subitem, but an item that is in a single level hierarchy), a service product main item SVB4 (a top level/parent of a two-level hierarchical item structure), and a service product subitem SVP4/SVS4/SVE4 (a bottom level/child of a two-level hierarchical item structure). In response to selecting a main item designation (e.g., detecting selection of an indicator corresponding to the service product main item described above), an account assignment object may be created in association with the entered information to generate a main item corresponding to the service bundle.

At 106, the method includes associating a plurality of subitems with the main item entered at 104. For example, the subitems may be entered similarly to the main item as described above, by entering a respective identifier and selecting a respective item type (e.g., service item SVS4, expense item SVE4, part item SVP4, etc.), and received via the user interface/API. In response, the account assignment object for the main item may be associated with the entered subitems. As described above, the subitems may include service items, expense items, service part items, etc. The subitems may be designated as a category that is not billing relevant, whereas the category of the main item may be designated and/or processed as being billing relevant.

At 108, the method includes releasing the service order. For example, after creating all subitems associated with the main item representing the service bundle, a confirmation of completion of the service bundle creation may be received via the user interface/API (e.g., based on an input from a user, such as a selection of a user interface object associated with a "complete service order entry" process).

At 109, the method includes displaying the service order in a user interface (e.g., the user interface used to enter the service bundle order information) in a hierarchical line view. For example, the main item may be displayed with a higher hierarchical level in the line view than the subitems (e.g., the subitems may be collapsible under the main item in some views).

After releasing/creating the bundled service order (e.g., the service bundle), the method may optionally include automatically performing follow-up processing for the service order, as indicated at 110. For example, a purchase requisition may be created automatically for each service part subitem as a procurement process when applicable (e.g., when the main item includes service part subitems). The created purchase requisition takes over the account assignment object of the service part item and transfers this object to their follow-up processing documents. The follow-up documents may include purchase order, goods receipt, supplier invoice, and/or other documents for the service bundle. A link between the service part subitem and the purchase requisition item may be available in a transaction history of the service part subitem in the service order for the bundled service.

At 112, the method includes generating pricing information for the service bundle. If a main item is entered and subitems are added, the pricing may result in one of the following cases:

A.1 If no conditions are maintained for the product of the main item (e.g., if no condition master record is defined), the net value of the main item is equal to the sum of the net values of the sub items.

A.2 If conditions are automatically determined for the product of the main item, based on conditional master data (e.g., base price PPR0), the net values of the sub items are added to the value of the main item in a first example. In a second example in which conditions are automatically determined for the product of the main item, net values of the sub items are statistically determined and are listed but not included for the main item price (e.g., the net price stays 0 if no price is found in the condition master record).

A.3 If a bundle price is automatically determined for the product of the main item, based on conditional master data, the net values of the sub items do not affect the main item.

The conditional master data may include existing pricing tables, where prices for the products may be defined by customer/segment, etc. Service order specific pricing data of the pricing conditions (e.g., all condition values of all items of a transaction) may be saved in a pricing document, which is created for each transaction (e.g., accessible via a reference link in a header table). For example, conditional master data may be maintained in a central customizing document/data structure (e.g., condition records) for pricing and may not be part of the account assignment object. The conditional master data may represent a set of circumstances that apply when a price is calculated, and may be used to define a price dependent on factors such as sold-to party, product, order quantity, date etc.

If a manual fixed amount is entered, the pricing may result in one of the following cases:

B.1 If a fixed amount is manually entered for the main item (condition type PMV1), the net values of the sub items do not affect the main item.

B.2 If a fixed amount is manually entered on transaction header (condition type PMV0), the price is broken down into parts that are then allocated proportionately to the main items dependent on the originally calculated net value.

The quantity of the main item may only have an impact in cases A.2 and A.3.

The pricing may also include the determination of tax on the service bundle. A service bundle may be handled as a whole with respect for tax. If any product in the subitems is to be considered with a specific tax calculation, these products may be bundled in a further service bundle or be added as single items.

At 114, the method includes generating a service confirmation for the service bundle. The main and subitems may be copied to the service confirmation, the main item to keep the hierarchy, and the subitems for execution of the service. The service confirmation items may receive the account assignment object of the corresponding service order items, that are taken from the assigned main item of the service order. The service item may trigger a creation of a timesheet, such as an S/4 timesheet, after completion. The timesheet may receive the account assignment object of the service item of the service confirmation. For this account assignment object, the posting of the timesheet may be performed. The expense item may trigger a posting to, for example, FICO, after completion. The posting may consider the account assignment object of expense item of the service confirmation. The main item and the service part subitem may not be used for further process steps, and may be completed.

At 116, the method includes releasing the service order for billing. For example, after release a billing document request (BDR) may be created only for the billing relevant main items of the service order. The subitems are not billing relevant and therefore no billing document requests are created for the subitems in some examples. The account assignment object of the main item of the service order may be transferred to the billing document request item. For the billing document request, the invoice can be created. The invoice item may consider the account assignment object of the main item of the service order. The billing status may be set in the service order and the billing document may be added in the transaction history. If a customer wants to, for example, print out the billing document with data from the predecessor document (e.g., the service transaction service order), the extensibility for billing document printout can be used. The data of service orders can be read using different interface views for service order header and service order items.

Example of User Interface

Figure 2:
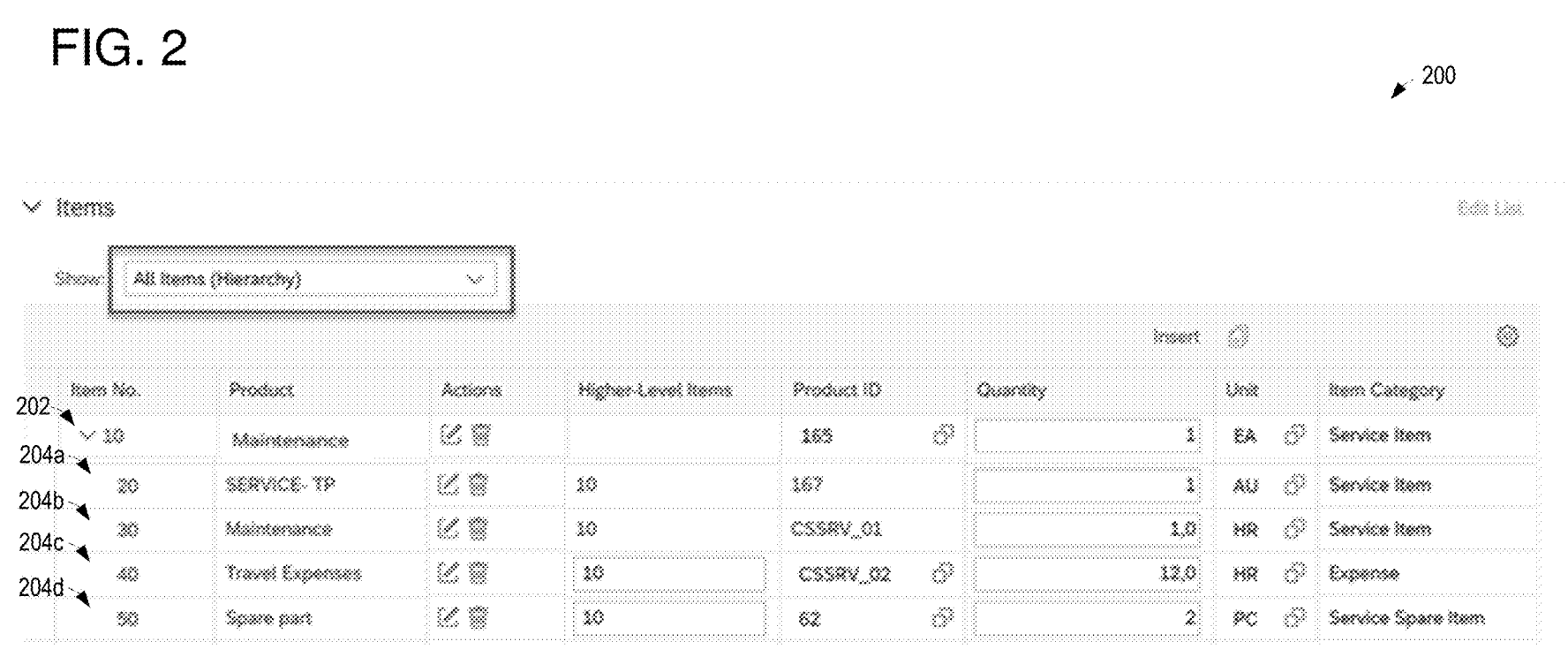

FIG. 2 shows an example portion of a user interface 200, which may be used to create and/or view a service bundle. For example, the user interface 200 may be displayed within a web browser or other application (e.g., calling an application programming interface (API) for interfacing with a service management system) of a client computer and used by a client to enter and/or view information regarding a main item and subitems for a service bundle, such as the service bundle created according to method 100 of FIG. 1.

As shown, user interface 200 includes individual line items for elements of the service bundle, including a first line item 202 for a main item representing the service bundle and a plurality of second line items 204a-204d for respective subitems offered as the service bundle. The view shown in FIG. 2 may be a hierarchical line view, where the main item is at a higher level than the subitems. Accordingly, the line item entries for the subitems may be able to be collapsed (e.g., hidden) under the line item entry for the main item responsive to a selection of a togglable user interface object. The line item entries may include fields such as Item Number (e.g., an identifier for the item), Product (e.g., a description or name for the product associated with the item), Actions (e.g., selectable user interface elements that may be selected to modify or delete the item), Higher-Level Items (e.g., an identifier of a parent item, applicable to subitems), Product ID (e.g., a unique identifier for the product associated with the item), Quantity (e.g., a quantity of the item), Unit (e.g., a unit for the quantity, such as "piece," "each," "hour," etc.), and Item Category (e.g., a type of item, such as a service item, an expense item, a service part/spare item, etc.). In some examples, such as examples where the user interface is deployed on the premises of an organization, the fields may be customizable.

At least some of the information entered and/or populated (e.g., based on other entered data) in the line items of the user interface may be used to create an account assignment object, as described above. Updates to the main item and/or subitems made via the user interface 200 may likewise be propagated to update the account assignment object accordingly. In some examples, updates made to a main item may be propagated to the subitems and/or updates made to one or more subitems may trigger changes in the main item. For example, if a status of a subitem is changed (e.g., to "released" or "completed,") resulting in all of the subitems having the same status, a status of the main item may be automatically changed to reflect the status of all of the subitems. Additional examples of connections between processing of the main item and the associated subitems are described below.

Examples for Changing/Copying a Service Bundle

A main item can be deleted, if all subitems can be deleted in the same time. If a main item is deleted, the subitems are deleted as well. Subitems can be deleted and added. If a main item is released, all subitems are released as well. If all subitems are released, the main item is automatically released.

Cancellation of the service order with service bundles may be possible with the same rules as for service orders without service bundles. If the quantity of subitems is changed, the quantity of the main item may not be changed automatically. In some examples, the quantity of the main item can be changed, and the quantity of the sub items may be adjusted manually.

When creating a service confirmation from a service order as follow-up transaction the copy control supports the copying of the hierarchy structure accordingly. Copying from service order to service order including the new item categories is supported.

Example Applications

Figure 3:
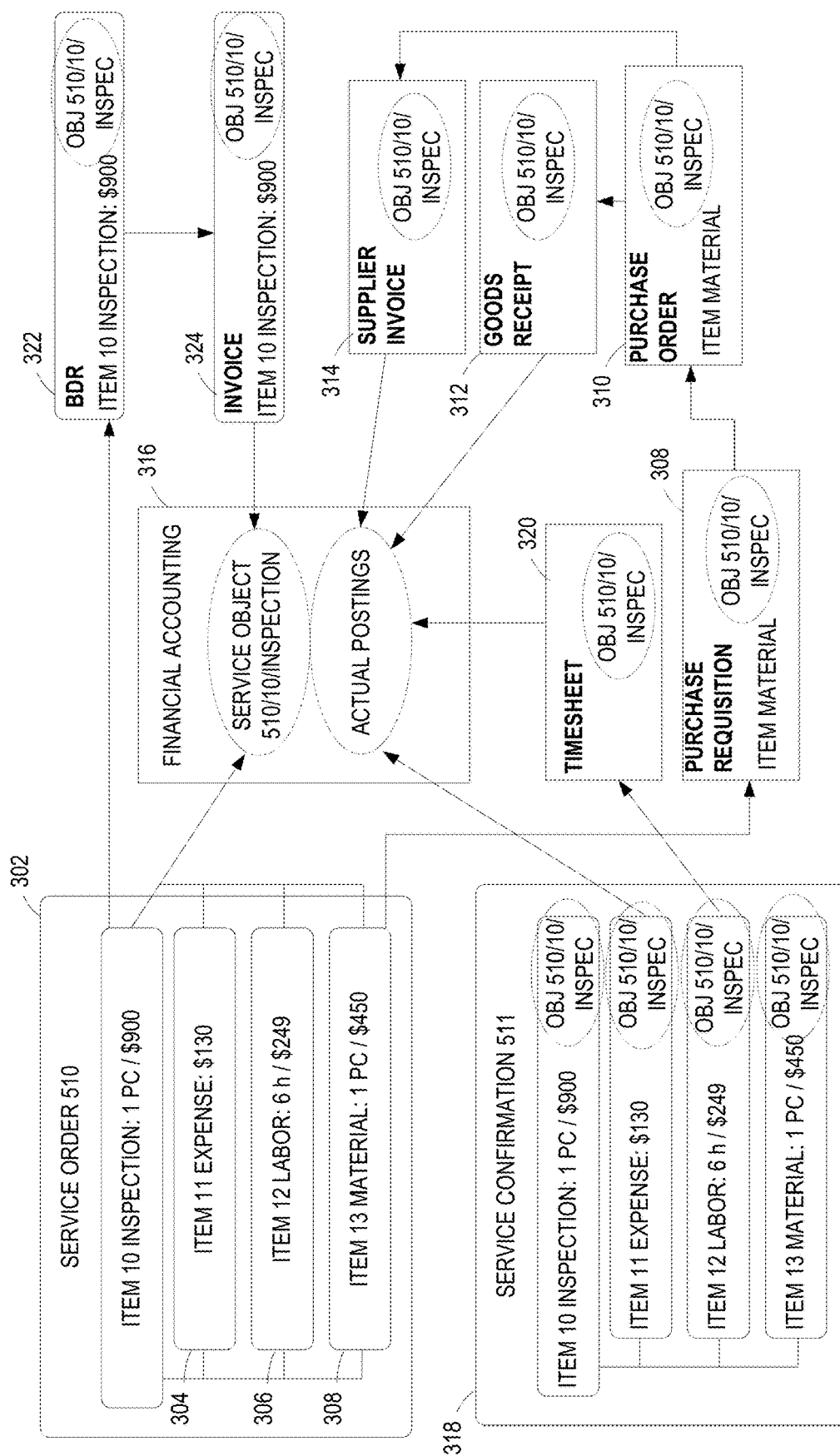
FIG. 3 is a diagram schematically depicting an example process flow for a service order for a service bundle.

FIG. 3 shows an illustrative example of a service order 302 with main item 10 (shown at 304) for Inspection and three subitems: subitem 11 (shown at 306) for Expense, subitem 12 (shown at 308) for Labor, and subitem 13 (shown at 310) for Material. As used herein, labor may relate to service type items, and material may relate to service part items (which may include and/or alternatively be referred to as service spare items). The material is procured via purchase requisition. As shown, the service order item 10 creates its account assignment object and the subitems inherits this account assignment object, so all refers to the same as represented by the arrows between the main/subitems and the account assignment object.

In the example application, the material is ordered via creation of a purchase requisition 308 that is used to generate a purchase order 310. The operative document flow of the item 13 is provided in the service order. The purchase requisition and the purchase order use the transferred account assignment object of the main item of the service order. The goods receipt 312 of the purchase order, and the supplier invoice 314 post their costs to the account assignment object of the main item of the service order, as managed in financial accounting 316.

In a next step a service confirmation 318 is created as follow-up. The complete hierarchy of the main and subitems is transferred, as shown. Account assignment of service confirmation items is carried out on the account assignment of the main service order item. The operational reference is to the items.

The service confirmation item for labor (via timesheet 320) and the expense subitems are posted their costs to the account assignment object of the main item of the service order. The completed service confirmation item for procured material does not post costs, as they are posted through goods receipt 312 and supplier invoice 314. The main item of the service order is billed via billing document request (BDR) 322 and Invoice 324, and the values are posted to its account assignment object.

Figure 4:
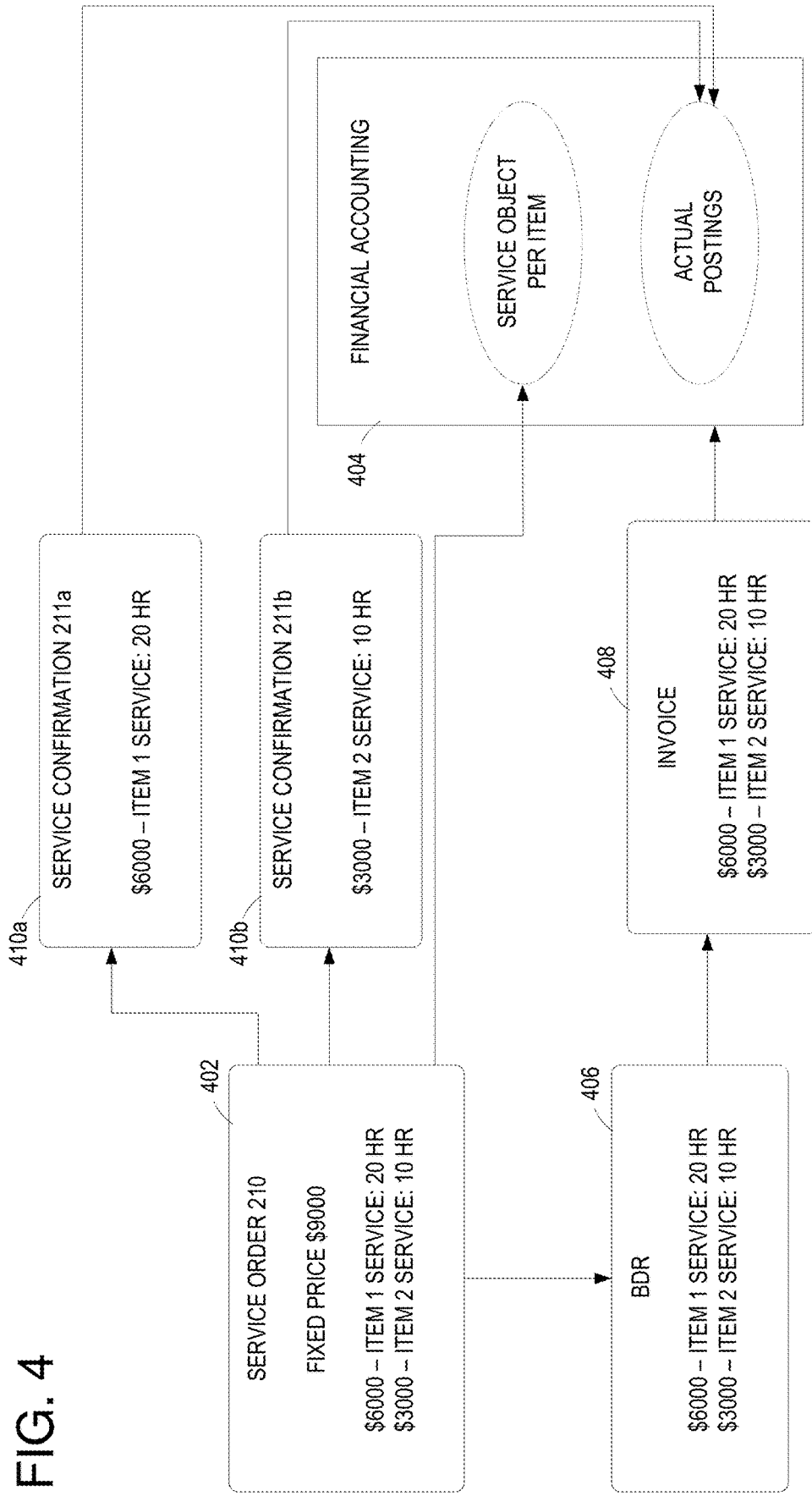
FIG. 4 is a diagram schematically depicting an example process flow for a header level fixed price scenario for service and expense items.

FIG. 4 shows another example processing flow for providing a fixed price on a header level for service and expense items. As described herein, a fixed price may be entered on the originally calculated value. Further, in the header-based example of FIG. 4, each item of the service order creates its own account assignment object, as shown in the financial accounting module 404. Each item of the follow-up document posts their values to this account assignment object respectively, as shown via the billing document request (BDR) 406/Invoice 408 path and the service confirmations 410a and 410b. A purchase order item refers to the account assignment object of the service order item of type service part (not shown in the illustrated example).

Example Use Cases

In a first example use case (A1), a main item Bundle Price (quantity-based) is automatically determined from the conditional master data. Table 1 below shows a non-limiting example of service bundle entries for example use case A1.

TABLE 1

Example values for main/subitems in example use case A1.

|  |  |  | Quantity | Price | Value |
|---|---|---|---|---|---|
| Main Item |  | Oil change | 2 Piece | 70 EUR/Piece | 140 EUR |
|  | Subitem Service Part | Oil filter | 2 Piece | 20 EUR/Piece | 40 EUR |
|  | Subitem service product | Technician labor | 2 h | 25 EUR/h | 50 EUR |
|  | Subitem expense item | Oil | 7.5 l | 6 EUR/l | 45 EUR |

In case A1, a price (PPR0) for the service bundle is automatically determined for the main item product based on conditional master data (e.g., a bundle price). In this example, the sub of the net value of the subitems is not relevant for the main item, but is still calculated for statistical reasons and for downstream processing (e.g., to evaluate profitability of the service bundle). Manually and automatically applied surcharges or discounts may be applied to the bundle in a same manner as used for non-bundled items.

In a second example use case (A2), a main item is provided without an automatically determined price from the conditional master data (quantity based). As shown in Table 2 below, the value of the main item stays 0 even if the sum of the subitems is not 0. Further actions are to be completed in order to complete the service bundle in this case. For example, the conditional master may not be maintained, or a manual price may be provided for the service bundle.

TABLE 2

Example values for main/subitems in example use case A2.

|  |  |  | Quantity | Price | Value |
|---|---|---|---|---|---|
| Main Item |  | Oil change | 2 Piece | 0 EUR/Piece | 0 EUR |
|  | Subitem Service Part | Oil filter | 2 Piece | 20 EUR/Piece | 40 EUR |
|  | Subitem service product | Technician labor | 2 h | 25 EUR/h | 50 EUR |
|  | Subitem expense item | Oil | 7.5 l | 6 EUR/l | 45 EUR | header, item level, or both header and item level. In the example of FIG. 4, a service order 210 (shown at 402 includes a fixed price header designation for two items (e.g., Item 1 and Item 2). As described in more detail below, if a fixed price is entered on header level, the fixed price on items is derived proportionately to the them dependent on In case A2, no conditions for the service bundle are found, thus the net value of the main item is still 0, even though the subitems have a net value no equal to 0. As with case A1, the sub of the net value of the subitems is not relevant for the main item, but is still calculated for statistical reasons and for downstream processing (e.g., to evaluate profitability of the service bundle). Manually and automatically applied surcharges or discounts may be applied to the bundle in a same manner as used for non-bundled items.

In a third example use case A3, a main item is provided with a manual price (quantity-based). As shown in Table 3 below, the value of the main item is set to 160 due to the manual entry of 80 per piece (the main item having a quantity of 2), even though the sum of the subitems is not 160. This manual entry may be provided after an automatic value is generated according to case A1 or case A2 in some examples. Manually and automatically applied surcharges or discounts may be applied to the bundle in a same manner as used for non-bundled items.

TABLE 3

Example values for main/subitems in example use case A3.

|  |  |  | Quantity | Price | Value |
|---|---|---|---|---|---|
| Main Item |  | Oil change | 2 Piece | 80 EUR/Piece | 160 EUR |
|  | Subitem Service Part | Oil filter | 2 Piece | 20 EUR/Piece | 40 EUR |
|  | Subitem service product | Technician labor | 2 h | 25 EUR/h | 50 EUR |
|  | Subitem expense item | Oil | 7.5 l | 6 EUR/l | 45 EUR |

In an example fixed item use case B1, a main item is provided with a manual Fixed Item Amount, as shown in Table 4. In case B1, a fixed bundle amount is manually entered for the main item and the item amount is assigned to a condition type PMV1 (Fixed Item Amount). The cumulated value of the subitems or a potential manual price is ignored. Manually and automatically applied surcharges or discounts do not apply to this use case.

The net values of main items are overruled by a proportionally calculated share of the header amount. For example, the value of the first main item, h1, and the value of the second main item, h2, may be calculated as follows:

$$h_1 = \frac{nv_{main\_1}}{nv_{main\_1} + nv_{main\_2}} * m_{header}$$

$$h_2 = \frac{nv_{main\_2}}{nv_{main\_1} + nv_{main\_2}} * m_{header},$$

where $nv_{main\_1}$ is the original value of the first main item and $nv_{main\_2}$ is the original value of the second main item.

The header fixed amount may be allocated proportionally to the main item values for the main items associated with the header. The item amount may be assigned to condition type PMV0, and the cumulated value of the subitems may be

TABLE 4

Example values for main/subitems in example use case B1.

|  |  |  | Quantity | Price | Value |
|---|---|---|---|---|---|
| Main Item |  | Oil change | 2 Piece |  | ~~135 EUR~~ 120 EUR |
|  | Subitem Service Part | Oil filter | 2 Piece | 20 EUR/Piece | 40 EUR |
|  | Subitem service product | Technician labor | 2 h | 25 EUR/h | 50 EUR |
|  | Subitem expense item | Oil | 7.5 l | 6 EUR/l | 45 EUR |

In an example fixed item use case B2, a header fixed amount is used for multiple service bundles (all pricing variations). As shown in Table 5 below, a fixed amount $m_{header}$ is manually entered on a transaction header (Manual Doc. Amount (PMV0)).

ignored (with reference to the main item values). The subitem net values may be summed up on the main item for statistical reasons as described above, for example, to give the user an idea of the sum value of the subitems for evaluations such as profitability calculations). For example,

TABLE 5

Example values for header, main items, and subitems in example use case B2.

|  |  |  | Quantity | Price | Value |
|---|---|---|---|---|---|
| Header |  | Fixed Amount |  |  | 1200 EUR |
| Main Item |  | Oil change | 1 Piece |  | 75 EUR |
|  |  |  |  |  | ~~100 EUR~~ |
|  | Subitem Service Part | Oil filter | 1 Piece | 20 EUR/Piece | 20 EUR |
|  | Subitem service product | Technician labor | 2 h | 25 EUR/h | 50 EUR |
|  | Subitem expense item | Oil | 5 l | 6 EUR/l | 30 EUR |
| Main Item |  | New Tires | 1 Piece |  | 1125 EUR |
|  |  |  |  |  | ~~1500 EUR~~ |
|  | Subitem Service Part | Rim | 4 Piece | 100 EUR/Piece | 400 EUR |
|  | Subitem service product | Technician labor | 2 h | 50 EUR/h | 100 EUR |
|  | Subitem expense item | Tires | 4 Piece | 250 EUR/Piece | 1000 EUR | as shown in Table 6, a field for statistical value may be added to provide an indication of the summed value of the subitems.

TABLE 6

Example values for main/subitems and statistical value of net subitem values.

| | | Quantity | Price | Value | Statistical Value |
|---|---|---|---|---|---|
| Main Item | Oil change | 1 Piece | | 0 EUR | 100 EUR |
| Subitem Service Part | Oil filter | 1 Piece | 20 EUR/Piece | 20 EUR | |
| Subitem service product | Technician labor | 2 h | 25 EUR/h | 50 EUR | |
| Subitem expense item | Oil | 5 l | 6 EUR/l | 30 EUR | |

Example Process Flow Between Applications

Figure 5:
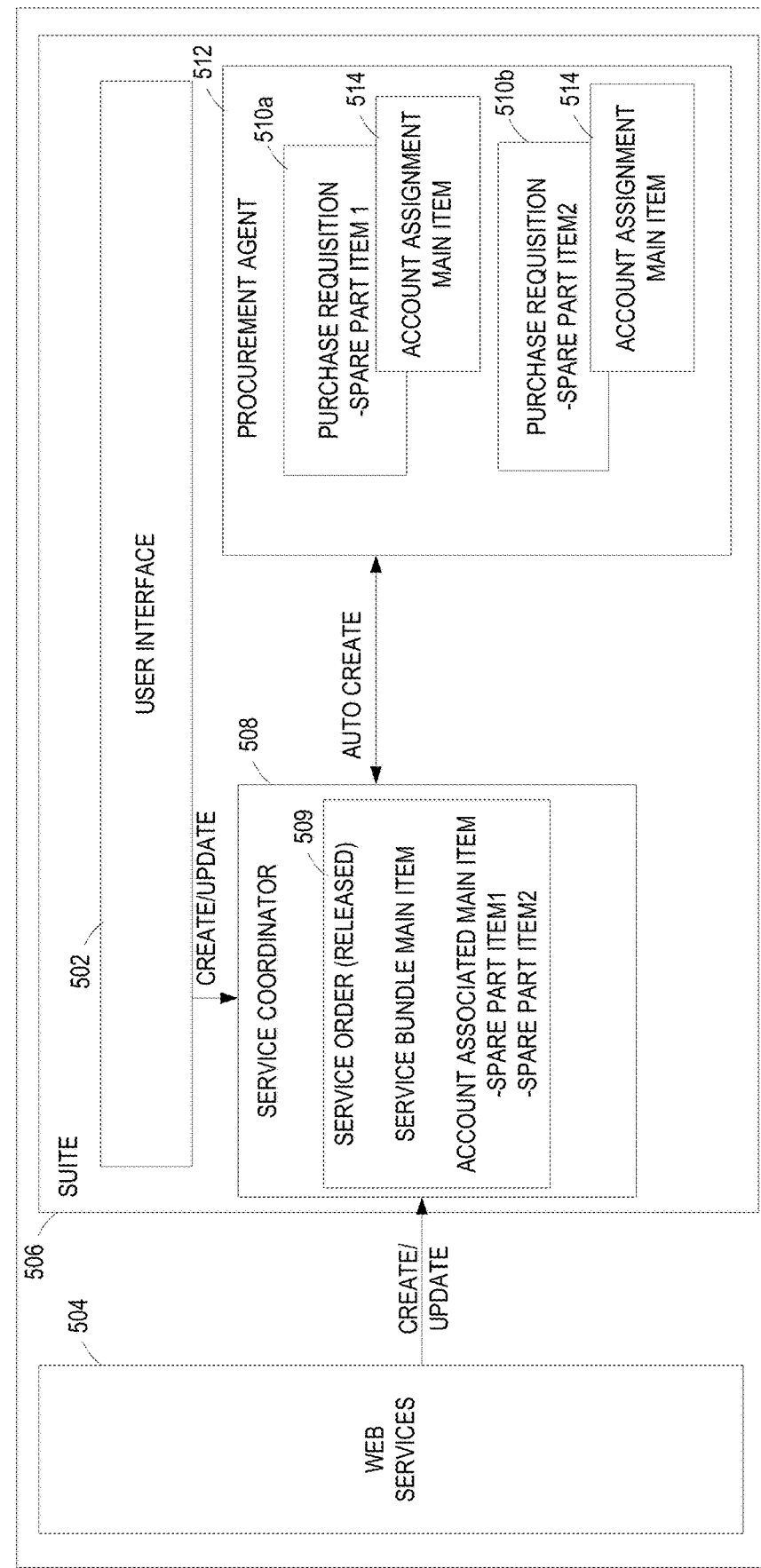
FIG. 5 is a diagram schematically depicting example applications used in the creation and/or processing of a service order for a service bundle.

FIG. 5 shows an example block diagram 500 of applications that may be used during the implementation of the service bundle operations described herein, such as the procurement of materials/parts when managing a service order for a service bundle. As described herein, a client may create and/or update service orders using a user interface, such as user interface 502 and/or a web-based application, such as web services 504. The user interface 502 may be a part of a suite 506 of applications (e.g., S4 HANA) used by an organization to manage service orders. In examples where the system is provided "On Premises," the user interface 502 may be directly accessed by a client computing device. In cloud-based examples, the user interface 502 may be accessed via an API and/or a client may indirectly access the suite 506 via web services 504.

A service coordinator 508 may be accessed by the user interface 502 and/or web services 504 to manage the creation and/or updating of service orders (such as service order 509) and/or to otherwise manage the processing of service orders. For example, the service coordinator 508 may automatically create purchase requisitions 510a and 510b via procurement agent 512 to request the part items included in the service bundle. As shown, the purchase requisition for each service part uses the account assignment object 514 for the main item associated with the service parts.

Figure 6:
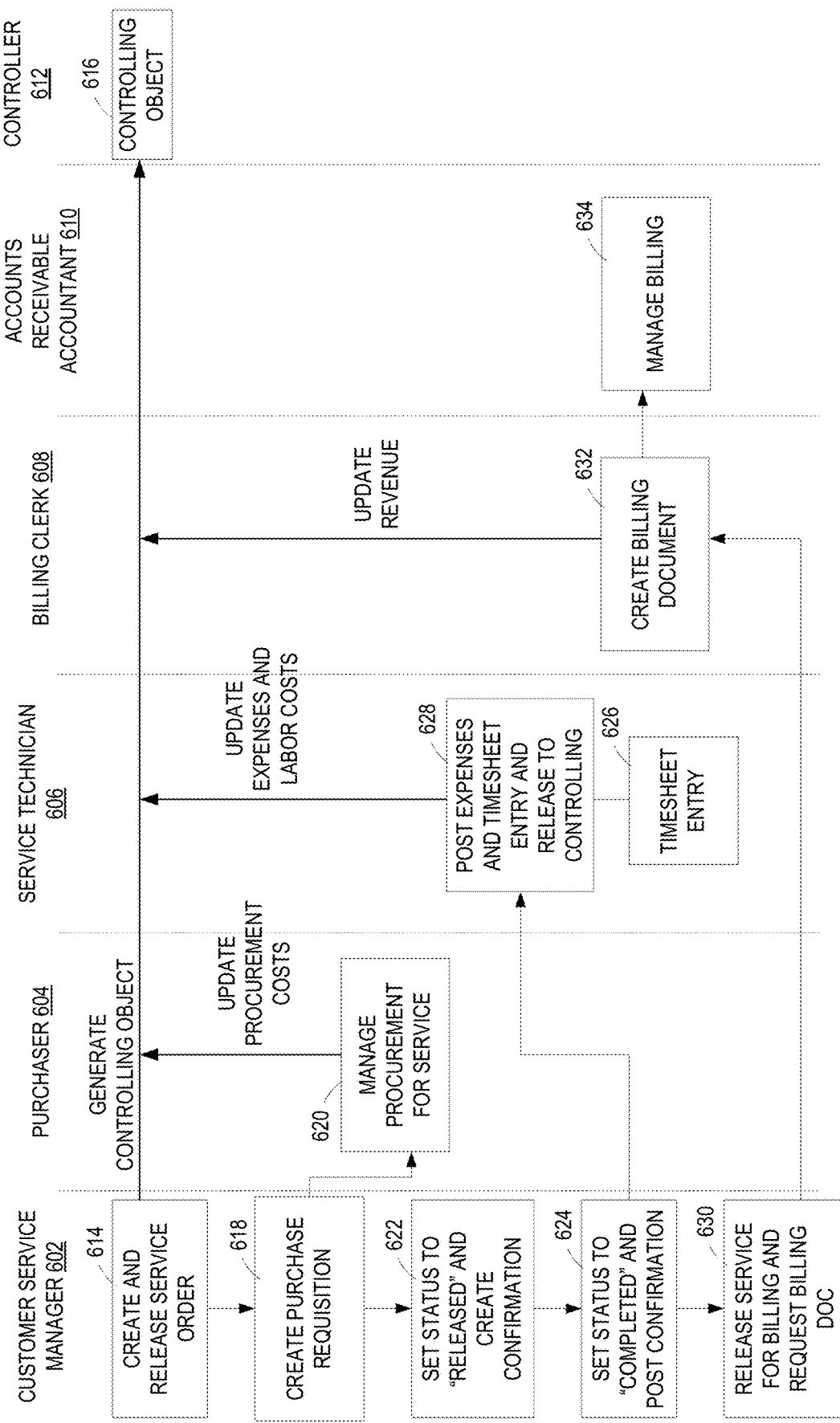
FIG. 6 is an example communication diagram for creating and processing a service order for a service bundle.

FIG. 6 shows an example communication diagram 600 showing processing flows between different entities involved in creating, processing, and servicing a service order for a service bundle. The example entities include a customer service manager 602, a purchaser 604, a service technician 606, a billing clerk 608, an accounts receivable accountant 610, and a controller 612. Each of the entities may include and/or utilize associated computing services to perform the shown processes. For example, the customer service manager may use the service coordinator 508 and/or the suite 506 of FIG. 5 (e.g., via the user interface 502 and/or web services 504) in some examples.

At 614, the customer service manager may create and release a service order for a service bundle, causing a controlling object 616 (e.g., an account assignment object) to be generated. At 618, the customer service manager may create a purchase requisition for any service part items included in the service order. The purchase requisition may be passed to the purchaser 604 to manage procurement for the service, as indicated at 620. In response, the controlling object 616 may be updated to include the procurement costs for procuring the service parts according to the purchase requisition.

At 622, the customer service manager may set the status of the service order to "released" and create a service confirmation. At 624, the customer service manager may set the status of the service order to "Released" and post the service confirmation, then set the status to "Completed". For example, service confirmations may only be created when the service order is in a "released" status, which means that the service is ready for execution. With the creation of the service confirmations, the service technicians may report their execution status (e.g., work and cost). The service confirmation may be provided to the service technician 606 to complete the services associated with the service bundle. The service technician 606 may create a timesheet entry 626 for the services and post expenses and the timesheet entry information, as indicated at 628, to update the expenses and labor/service costs in the controlling object 616.

Upon completion of the service bundle, the customer service manager may release the service order for billing and request a billing document, as indicated at 630. The billing document request may be provided to the billing clerk 608 in order to trigger the billing clerk to create the billing document at 632. The billing clerk may further update the controlling object 616 to reflect revenue information relating to the billing document. The billing document may be provided to the accounts receivable accountant to manage the billing, as indicated at 634 (e.g., to coordinate the collection of payment, etc.).

Additional optional operations may be performed in the flow shown in FIG. 6. For example, if the service order is updated, the updated item information may be propagated to the relevant entities and used to update the controllable object 616 accordingly. Furthermore, after completion of a service order, the customer service manager may analyze the service fulfillment by evaluating the controllable object. For example, the customer service manager may compare the costs of the subitems to the billed cost to determine profitability.

Further Implementation Examples

Software tools to implement the disclosed technologies can be incorporated into an S/4 HANA environment, using facilities such as S/4 HANA Defense and Security product, NetWeaver Application Server, ABAP programming environment, ABAP managed database procedures (AMDP), the ABAP Core Data Services (CDS) ecosystem, oDATA services, Simple Object Access Protocol (SOAP) Application Programming Interface (API) asynchronous services, CRM WebUI framework, 1Order Framework, and/or Fiori user experience launchpad. The following implementation examples include updates to software tools to provide various features of the disclosed technologies.

Indicator for Main and Subitem Specific Logic

A new domain CRMS4_CONFIRM_RELEVANT of type character length 1 may be created with three fixed values, such as X (relevant), S (relevant for confirmation, not for execution), and [any other character/NULL] (not relevant). In order to accommodate the three possible values, a confirmation relevance field in a user interface for creating a service bundle or service order for a service bundle may include a dropdown menu including the above-described fixed values as selectable options. For example, by including LCRM_ORDER_CDF13, the form crmv_service_i_modify_0053 is adopted to enable the dropdown. The values are filled dynamically depending on the bus type and cloud/onPremise environment.

Field Check Implementation on the Service Confirmation Service Product

The fields 'Actual Duration' and 'Actual Duration unit' may be set to read only in case of a service confirmation service product main item. For this, single field check function CRM_ORDERADM_I_SRVC_BUNDLE_FC is implemented. In view CRMV_FIELDCHECK, the field check is registered to be executed.

Field Check <ServiceDuration unitCode="hur"> on the Service Order

The SOAP API for the service order has a tag <ServiceDuration unitCode="hur">0.4</ServiceDuration>. This tag is saved in a different field in table CRMS4D_SERV_I than the 'Actual Duration' field on the Web UI. It is saved in the fields DURATION and DURATION_UNIT. For these two field another field check function is implemented and assigned in table CRMV_FIELDCHECK. Function CRM_SERVICE_I_DURATION_FC is copied from the formerly assigned function CRM_SERVICE_I_FC and enhanced with service bundle code.

No Check 'Actual Duration' on the Service Bundle Main Item

The main item is not relevant for cost posting. Therefore, the error message that actual duration must have values, may be deleted. Function module CRM_CONFIRM_SRV_I_TIMES_EC which checks this is enhanced and not executed in case of a service bundle main item.

Field Check Implementation for the Higher-Level Item Field

View CRMV_FIELDCHECK has a field check registration for the higher-level item field. The function CRM_ORDERADM_I_NUMBER_PAREN_FC is enhanced with code which forbids the change of the higher level item field in case of a main or sub item (e.g., only on the service confirmation, not the service order, in order to maintain the structure). The relevant code is capsulated in class method cl_crms4_srv_bundle_util=>fieldcheck_higher_item( ).

Field CONFIRM_RELEVANT and Copy Control

For the service bundle main item, the field CONFIRM_RELEVANT may be copied from the service order to the service confirmation. For this to work, the following enhancements were done: Include LCRM_SERVICE_I_OWF15. The field CONFIRM_REELVANT is taken over if the value is 'S' (service bundle main item). In function CRM_SERVICE_I_FC_CONFIRM_RELE the field CONFIRM_RELEVANT may be set to changeable in case there is a service confirmation service product (BUS2000143). Further on, only the value 'S' is taken over (not 'X') in some examples in order to minimize side effects.

Accounting Integration

Enhancement for Service Order

In Service Order, the sub-items of a service bundle have no account assignment objects assigned. A check is performed in the method MAINTAIN_ACCOUNTING_CO_SRV of class CL_CRMS4_PROCESS_FWD which is the base class for forward logistic process in the data exchange framework (package: CRMS4_DATAEXCHANGE_BTX). First, it is checked if an item has a parent item. If it does, then it is further checked if the parent item is the main item (e.g., Service Bundle). If it is, then the code for account assignment is skipped by continuing the loop.

Enhancement for Service Confirmation

For Service Confirmation, the sub-items of a service bundle are assigned the same account assignment object as their parent main item. A check is performed in the method READ_SERV_ORD_DATA which basically reads the items in the referenced service order and returns the account assignment key. This method is also implemented in class CL_CRMS4_PROCESS_FWD.

First, the parent identifier (e.g., Guid) of an item is retrieved and if it isn't initial (e.g., if that item has a parent item), the parent item id is further retrieved. Then it is checked if the parent item is the main item (e.g., Service Bundle). If it is, then the parent item id is assigned as the key of account assignment object. Otherwise, the item id is used for account assignment object.

Procurement Integration

Enhancement of View CRMS4V_SALES_I

For the additional customizing for the service bundle subitem service part, the new entry may be created. The view CRMS4V_SALES_I has a selection option which may be enhanced for item category SVS4. Additionally, the maintenance view may be regenerated in SE54. So the maintenance view include LCRMS4_SALES_IF00 is updated.

Transfer the Main Item Number for Service Part Subitem to Automatically Created Purchase Requisitions Class CL_CRMS4_PROC_SRVORDER_FWD, method PREPARE_PURCH_REQ is enhanced. First it is checked if the parent of the service part is a main item. If yes, the main item number is taken for accounting. Otherwise, the service part number. Later on, after accounting was handled, the structure may be filled again with the service part main item number.

Accounting Check on the Purchase Requisition

When the accounting object is created, it checks if the accounting data refer really to a service part. But for the service part subitems, the item number of the accounting object is now that of a main item. Therefore, the code throws an error as it reads, the item is determined to be a service product main item. The code may be adapted. Here, class method CL_CRMS4_LOGINT_UTIL→DETERMINE_PR_FROM_SRVO( ) is enhanced. The new code checks if the given accounting data for which the accounting data is used (the main item in the service bundle case) has at least one service part as a subitem.

For this a new helper method CL_CRMS4_SRV_BUNDLE_UTIL=>IS_MAIN_ITEM_WITH_SERV_PART is implemented which checks if a given item number is a service bundle main item and if there is at least one subitem service part below. It may not be able to be defined during runtime which specific sub item service part is there. Therefore, the check is somewhat unspecific. For the check to be 100%, the item number of the service bundle subitem service part would have to be handed over during PR creation, so that the accounting check could have access to this info as well.

Accounting Check on the Purchase Requisition

The same check that the accounting object key is a spare part exists on the purchase order. Here, class method CL_CRMS4_LOGINT_UTIL→CHECK_SRV_ORDER_VALID is adopted in parallel to the purchase requisition.

Filter out Main and Subitems in the Account Assignment F4 Helps

For the adoption of F4 help CRMS4H_SERV_I, the F4 help is enhanced so it reads the PARENT field as well. The field PARENT is not displayed on the F4 help as search criteria or on the result list. Additionally, the F4 exit function CRMS4_LOGISTIC_EXT_SHLP_EXIT is created which filters out the main and subitems.

For the FIN F4 help FCO_SHLP_SRVDOC, method IS_MAIN_ITEM_FOR_PR is provided which can be used by the FIN colleagues to enhance the F4 exit function FCO_SHLP_SRVDOC_EXIT to filter out main items. The FIN F4 help will not display subitem entries because they do not create an account assignment object.

```
    CALL                              METHOD
        cl_crms4_srv_bundle_util=>IS_MAIN_ITEM_FOR_
        PR
    EXPORTING
        iv_objtype_h='BUS2000116'
        iv_object_id=
        iv_item_no=
    RECEIVING
        rv_result=.
```

Field CONFIRM_RELEVANT may be available directly in the CDS view used in the search help CRMS4H_SERV_I. As prerequisite CDS I_ServiceOrderItem was enhanced. The field was named SrvcOrderConfirmationRelevance in the CDS view.

Use Case Deletion Status in Purchase Requisition Item is Set/Deleted or Approval Workflow in Purchase Requisition is Rejected In the case, the deletion Status is set in the purchaser requisition, the service bundle service part sub item is set to status rejected (completed with rejection). In case the deletion status is deleted, the service bundle service part sub item is set back to status released. Class CL_CRMS4_PROCESS_PR_BWD IF_CRMS4_SRV_LOGISTICS_BWD~EXECUTE is enhanced so that in case it's a service bundle sub item service part, it takes the item number of the main item. The class then reads the status to be set via function CRMS4_SRV_LOGISTIC_GET_STATUS. The function is enhanced so that in case the deletion indicator is set or the workflow is not approved (Field PROCSTAT with value '08'), the rejected status is set. The status is saved further down via existing code.

For the sub item service part, the method release_rejected_item_again is called if the status is '18852' (PR created). This method checks if the status is to be reset from Rejected with completed to released again. If yes, it saves the document. This is used because function CRMS4_SRV_LOGISTIC_GET_STATUS gives back the status '18852' which is already existing on the service order sub item service part. Then no change is triggered by the existing code.

Helper Method CL_CRMS4_SRV_BUNDLE_UTIL=>RELEASE_REJECTED_ITEM_AGAIN

To execute the reset of the service bundle service part subitem to status released if the deletion indicator is deleted on the corresponding PR, the method first checks if the rejected status is active in the service order item. If yes, the process UNCN (reject rejection' is set. Afterwards the process RELE (Released) is set again.

Warning Message: Service Bundle Main Item w/o Subitems

In this case, the user creates a service order with a service bundle main item w/o service bundle subitems, and in response, a warning message is raised.

Status Handling

For the orchestration of the service bundle main-item status three different event-callbacks are registered that cover the different scenarios for a status re-evaluation.

Scenario 1~Sub-Item Status Change

When a sub item has its status change the main item status may be re-evaluated. Therefor a callback is registered. The FM CRMS4_SERVICE_I_HIER_STAT_EC will evaluate all current status of the sub-items below the very same main-item and update the main-item accordingly.

Scenario 2—Changing Assignment to a Service Bundle Main-Item

There are two possibilities to change the assignment to a service bundle main-item. One by setting the attribute PARENT/NUMBER_PARENT to the value guid/number of the main-item. The other one by removing the PARENT/NUMBER_PARENT from the sub-item. There is a callback registered for this. The FM CRMS4_SERVICE_I_PARENT_UPD_EC will evaluate the status of the sub-items assign to the corresponding main-item (new/old PARENT) and re-evaluate the new status.

Scenario 3—Deleting a Sub Item

Sub-Items can be deleted prior to the status 'released' (I1004). For this special case another callback is registered. The FM CRMS4_SERVICE_I_SUB_DELETE_EC has nearly the same logic as the move-out part of the FM CRMS4_SERVICE_I_PARENT_UPD_EC but was used due to another signature in the event-framework.

All of those event-callbacks use the class cl_crms4_srv_bundle_util which was introduced for handling functionality on the new introduced service bundle. The status handling may not set the status of the main-item higher than the lowest sub-item status. This is covered as setting a new status on the main-item will be populated down to the sub-items and could change status from items that were not taken into account. For example, without the status handling described above, setting the main-item to "in process" would be populated to sub-items that are in "open" and thus change them, which may cause issues. The main-item status may only change to match the status of the subitems when all (100%) of the main-item-related subitems have the same lifecycle status.

Status Handling Upwards

During the tests it was found that the setting of the 'Completed' status is not down-propagated in the service order and confirmation. In the on Premise release, this works for the quotation because event function CRM_SRVQUOT_I_SC_STAT_INHER_EC is registered to the quotation. As result, the new function CRMS4_SERVICE_I_HIER_STAT_EC is implemented which handles the down-propagation of the status Completed in the service order and service confirmation for the service bundle. It is registered to the service item structure and registered to the BUS2000116 and BUS2000117 for object STATUS and event AFTER_CHANGE, only with attribute I1005 (completed).

The function checks for service bundle main items with status completed and exists if it is with status cancelled (I1032), reads all sub items of the specific main item, and sets the status to completed if it is not yet so.

Status Handling with Errors in the Data Exchange Framework

When there are errors in the data exchange framework, for example, an expense item does not have the amount value maintained before it is completed, the framework sets the item to status 'Open' and as well the corresponding service order item to status 'Released'. This status setting from the data exchange framework is done with direct functions which do not trigger the event 'Status'.

In case that there is a service bundle with subitem and one of the subitems is in the service confirmation reset to status 'open' because of errors, the respective main item may be as well set to 'open' again manually because the 'Status' event is not triggered. For this the function CRM_SRV_CONFIRMATION_OLTP_TO is enhanced to set the corresponding service confirmation main item status. For setting the corresponding status of the service order main item, the class method is enhanced for CL_CRMS4_PROC_SRVCONF_FWD→RESET_PREDECESSOR.

Follow-Up Creation Service Order to Service Confirmation

In some examples, such as a cloud-based application, a user interface provides a quick create option for generating a service confirmation as a follow-up of a service order, using predefined operations. In other examples, such as an on-premise application, the service confirmation may be created with a follow-up dialog, which provides more flexibility and customization (e.g., allows a user to select more parameters for the service confirmation than the quick create option).

If a follow-up service confirmation is created using the dialog, the following logic may be implemented:

If a main item is selected, all subitems are selected automatically

If a subitem is selected, the parent main item is selected as well

If the last subitem is deselected, the main item is deselected as well.

Interaction with the Button 'Reject all Items'

A user interface button 'Reject All Items' in the service order may be configured to set all items and the document status to the 'Completed with Rejection' status. It is possible to afterwards use the 'Reject Item Rejection' button which sets the items to the old status. It may be checked that the Service Part item which was set to status 'Completed with rejection' from a purchase requisition goes back to the old status which means that it stays in the 'Completed with rejection' status.

A Generalized Computer Environment

Figure 7:
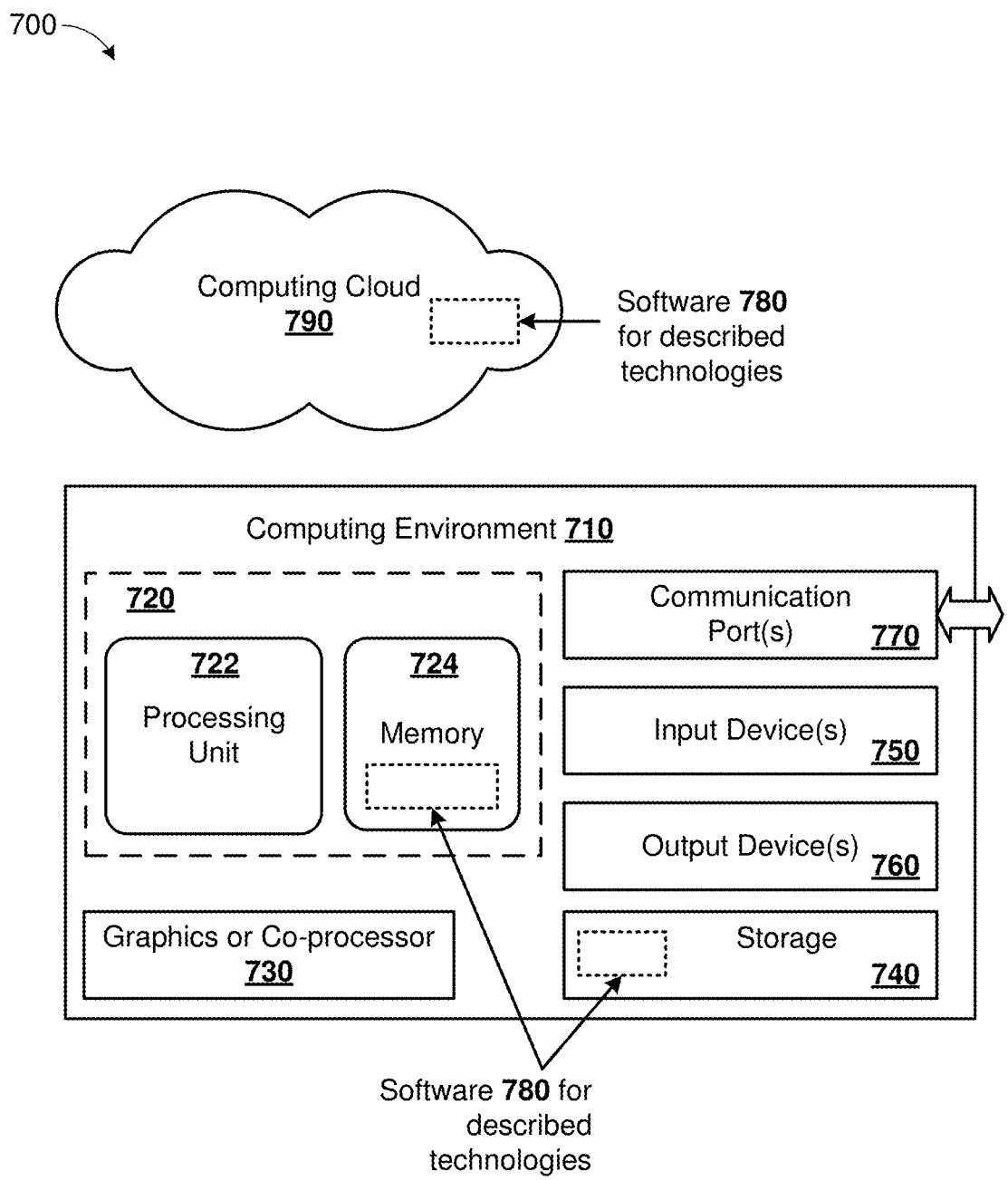
FIG. 7 is a diagram schematically depicting a computing environment suitable for implementation of disclosed technologies.

FIG. 7 illustrates a generalized example of a suitable computing system 700 in which described examples, techniques, and technologies, including construction, deployment, operation, query processing, and maintenance of a composite graph data structure or dynamic rooted trees according to disclosed technologies can be implemented. The computing system 700 is not intended to suggest any limitation as to scope of use or functionality of the present disclosure, as the innovations can be implemented in diverse general-purpose or special-purpose computing systems.

With reference to FIG. 7, computing environment 710 includes one or more processing units 722 and memory 724. In FIG. 7, this basic configuration 720 is included within a dashed line. Processing unit 722 executes computer-executable instructions, such as for implementing any of the methods or objects described herein for performing queries on a composite graph data structure representing a dynamic system, or various other architectures, components, handlers, managers, modules, or services described herein. Processing unit 722 can be a general-purpose central processing unit (CPU), a processor in an application-specific integrated circuit (ASIC), or any other type of processor. In a multi-processing system, multiple processing units execute computer-executable instructions to increase processing power. Computing environment 710 can also include a graphics processing unit or co-processing unit 730. Tangible memory 724 can be volatile memory (e.g., registers, cache, or RAM), non-volatile memory (e.g., ROM, EEPROM, or flash memory), or some combination thereof, accessible by processing units 722, 730. The memory 724 stores software 780 implementing one or more innovations described herein, in the form of computer-executable instructions suitable for execution by the processing unit(s) 722, 730. The memory 724 can also store a composite graph data structure, including nodes, edges, and their respective attributes; a table or other data structure indicating states of a modeled system, configuration data, UI displays, browser code, data structures including data tables, working tables, change logs, output structures, input fields, output fields, data values, indices, or flags, as well as other operational data.

A computing system 710 can have additional features, such as one or more of storage 740, input devices 750, output devices 760, or communication ports 770. An interconnection mechanism (not shown) such as a bus, controller, or network interconnects the components of the computing environment 710. Typically, operating system software (not shown) provides an operating environment for other software executing in the computing environment 710, and coordinates activities of the components of the computing environment 710.

The tangible storage 740 can be removable or non-removable, and includes magnetic disks, magnetic tapes or cassettes, CD-ROMs, DVDs, or any other medium which can be used to store information in a non-transitory way and which can be accessed within the computing environment 710. The storage 740 stores instructions of the software 780 (including instructions and/or data) implementing one or more innovations described herein.

The input device(s) 750 can be a mechanical, touch-sensing, or proximity-sensing input device such as a keyboard, mouse, pen, touchscreen, trackball, a voice input device, a scanning device, or another device that provides input to the computing environment 710. The output device(s) 760 can be a display, printer, speaker, optical disk writer, or another device that provides output from the computing environment 710.

The communication port(s) 770 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 700 can also include a computing cloud 790 in which instructions implementing all or a portion of the disclosed technology are executed. Any combination of memory 724, storage 740, and computing cloud 790 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 8:
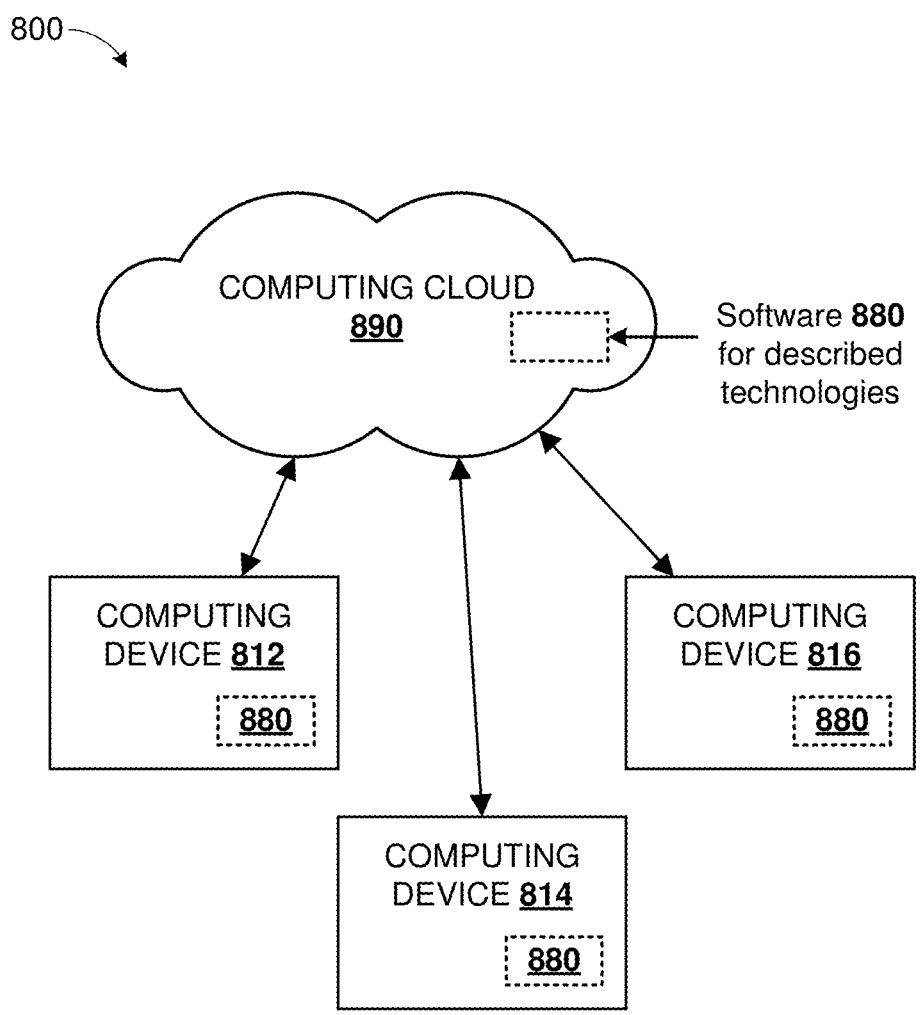
FIG. 8 is a diagram schematically depicting computing devices operating in conjunction with a computing cloud for implementation of disclosed technologies.

FIG. 8 depicts an example cloud computing environment 800 in which the described technologies can be implemented. The cloud computing environment 800 comprises a computing cloud 890 containing resources and providing services. The computing cloud 890 can comprise various types of cloud computing resources, such as computer servers, data storage repositories, networking resources, and so forth. The computing cloud 890 can be centrally located (e.g., provided by a data center of a business or organization) or distributed (e.g., provided by various computing resources located at different locations, such as different data centers and/or located in different cities or countries).

The computing cloud 890 can be operatively connected to various types of computing devices (e.g., client computing devices), such as computing devices 812, 814, and 816, and can provide a range of computing services thereto. One or more of computing devices 812, 814, and 816 can be computers (e.g., servers, virtual machines, embedded systems, desktop, or laptop computers), mobile devices (e.g., tablet computers, smartphones, or wearable appliances), or other types of computing devices. Communication links between computing cloud 890 and computing devices 812, 814, and 816 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 812, 814, and 816 can also be connected to each other.

Computing devices 812, 814, and 816 can utilize the computing cloud 890 to obtain computing services and perform computing operations (e.g., data processing, data storage, and the like). Particularly, software 880 for performing the described innovative technologies can be resident or executed in the computing cloud 890, in computing devices 812, 814, and 816, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 7, computer-readable storage media include memory 724, and storage 740. The term computer-readable storage media does not include signals and carrier waves. In addition, the term computer-readable storage media does not include communication ports (e.g., 770) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, Angular, C, C++, C#, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer-implemented method comprising:
   receiving service order data for an order of a service bundle, the service order data including main item information for a main item representing the service bundle and subitem information for a plurality of subitems offered collectively as the service bundle;
   generating an account assignment object in a service order database corresponding to the main item, the account assignment object having a hierarchy structure, where the plurality of subitems are associated with the main item in accordance with the hierarchy structure, and where the main item is higher in the hierarchy structure than the plurality of subitems;
   setting a value associated with the main item in the account assignment object, the value of the main item corresponding to a price of the service bundle;
   automatically performing follow-up computer processing on the order using the account assignment object to generate follow-up documents for the order;
   generating a billing document for the order using the account assignment object, the billing document indicating a requested payment that is equal to the value of the main item;
   displaying, in a graphical user interface, entries for each of the main item and the plurality of subitems for the order in a hierarchical line item view based on the hierarchy structure of the account assignment object;
   receiving, via the graphical user interface, input including first updates to the main item or second updates to one or more of the subitems; and
   updating the account assignment object in accordance with the first or second updates, where the first updates are selectively propagated automatically to the one or more subitems and the second updates are selectively propagated automatically to the main item based on the hierarchy structure.

2. The computer-implemented method of claim 1, wherein the main item is designated as a first type of service item, and wherein the plurality of subitems are each designated as a respective one of a second type of service item, an expense item, or a service part item.

3. The computer-implemented method of claim 1, wherein at least one of the plurality of subitems includes a service part item, and wherein automatically performing follow-up processing on the order comprises automatically generating a purchase requisition for a service part corresponding to the service part item using the account assignment object of the main item.

4. The computer-implemented method of claim 3, wherein the account assignment object of the main item is updated to include procurement costs relating to the purchase requisition for the service part.

5. The computer-implemented method of claim 4, wherein the procurement costs are based on a goods receipt or a supplier invoice generated responsive to a purchase order for the service part and associated with the account assignment object, the purchase order being generated responsive to the purchase requisition.

6. The computer-implemented method of claim 1, further comprising generating a service confirmation using the account assignment object.

7. The computer-implemented method of claim 6, wherein the plurality of subitems include at least one expense item or service item, and wherein generating the service confirmation includes posting costs for the at least one expense item or service item.

8. The computer-implemented method of claim 7, wherein the plurality of subitems includes at least one expense item, and wherein the costs for the at least one expense item are posted based on a timesheet.

9. The computer-implemented method of claim 1, wherein setting the value of the main item includes receiving user input indicating a fixed price and setting the value of the main item to the fixed price.

10. The computer-implemented method of claim 9, wherein a net value of the subitems are independent from the value of the main item.

11. The computer-implemented method of claim 9, wherein the main item is one of a plurality of main items associated with a transaction header, wherein the fixed price is entered for the transaction header, and wherein the fixed price is broken down into parts that are allocated proportionally to the plurality of main items.

12. The computer-implemented method of claim 1, wherein setting the value of the main item includes automatically determining a sum of net values of the plurality of subitems and setting the value of the main item to the sum.

13. The computer-implemented method of claim 1, further comprising receiving an input of a quantity of the main item for the service order.

14. The computer-implemented method of claim 13, wherein setting the value of the main item includes:
   automatically determining a sum of net values of the plurality of subitems and a base price associated with the main item, and
   setting the value of the main item to a product of the determined sum and the quantity of the main item.

15. The computer-implemented method of claim 13, wherein setting the value of the main item includes determining a base price for the main item and setting the value of the main item to a product of the base price and the quantity of the main item.

16. One or more computer-readable media storing instructions which, when executed by one or more hardware processors, cause the hardware processors to perform actions comprising:
generating an account assignment object in a service order database corresponding to a main item representing a service order for a service bundle, the account assignment object having a hierarchy structure, where the plurality of subitems are associated with the main item in accordance with the hierarchy structure, and where the main item is higher in the hierarchy structure than the plurality of subitems;
updating the account assignment object in the service order database to include a value of the main item corresponding to a price of the service bundle;
automatically updating the account assignment object in the service order database to include costs associated with the plurality of subitems;
generating a billing document for the order using the account assignment object;
generating a graphical user interface for display at a client computing device, the graphical user interface displaying entries for each of the main item and the plurality of subitems for the service order in a hierarchical line item view based on the hierarchy structure of the account assignment object, wherein the value of the main item is included in the billing document and shown in the hierarchical line item view in the entry for the main item and the costs associated with the plurality of subitems are shown in the hierarchical line item view in respective entries for the plurality of subitems; and
responsive to receiving, via the graphical user interface displayed at the client computing device, input including first updates to the main item or second updates to one or more of the subitems, updating the account assignment object in accordance with the first or second updates, where the first updates are selectively propagated to the one or more subitems and the second updates are selectively propagated to the main item based on the hierarchy structure.

17. The one or more computer-readable media of claim 16, wherein the plurality of subitems includes at least one service type subitem, at least one expense type subitem, or at least one service part type subitem, and wherein the costs associated with the plurality of subitems are posted to the account assignment object based on one or more respective purchase orders for the at least service part type subitem, one or more respective timesheets for the at least one service type subitem, or a service confirmation for the at least one expense type subitem.

18. The one or more computer-readable media of claim 16, wherein the actions further comprise analyzing a fulfillment of the service order by comparing a net value corresponding to a sum of the costs of the plurality of subitems to the value of the main item.

19. A system comprising:
one or more hardware processors with memory coupled thereto;
computer-readable media storing instructions executable by the one or more hardware processors, the instructions comprising:
first instructions to receive, via input to a graphical user interface displayed on a client computing device, service order data for a service order of a service bundle, the service order data including main item information for a main item representing the service bundle and subitem information for a plurality of subitems offered collectively as the service bundle, the plurality of subitems including a service part subitem;
second instructions to generate, for display via the graphical user interface, a hierarchical line view of the service order including a first line item entry for the main item and a plurality of second line item entries each associated with a respective subitem of the plurality of subitems;
third instructions to generate an account assignment object associated with the main item, the account assignment object having a hierarchy structure in correspondence with the hierarchical line view of the service order, where the main item is higher in the hierarchy structure than the plurality of subitems;
fourth instructions to automatically generate a purchase requisition for the service part subitem, the purchase requisition identifying the account assignment object of the main item; and
fifth instructions to generate a service confirmation for the service order using the account assignment object of the main item, the service confirmation maintaining the hierarchy structure of the account assignment object; and
sixth instructions to generate and display or print a billing document for the service order using the account assignment object of the main item, the billing document including a request for payment equal to a value of the main item, the value of the main item being automatically set according to master data indicating a base price of the main item or set based on an overriding fixed price input received via the graphical user interface.

20. The system of claim 19, wherein costs of the subitems are posted in the account assignment object of the main item after generating the service confirmation and wherein the instructions further include seventh instructions to update the second line item entries with the respective costs for the associated subitems.

* * * * *